June 7, 1966

L. A. HARVEY 3,254,927

COMBINED PHONOGRAPH RECORD HOLDER AND RECORD CONTAINER PICTURE FRAME

Filed July 3, 1963

INVENTOR.
LOUIS A. HARVEY

BY Barthel & Bugbee
ATTORNEYS

United States Patent Office 3,254,927

Patented June 7, 1966

3,254,927
COMBINED PHONOGRAPH RECORD HOLDER AND RECORD CONTAINER PICTURE FRAME

Louis Adam Harvey, 12977 Riopelle Ave., Detroit, Mich.

Filed July 3, 1963, Ser. No. 292,641
2 Claims. (Cl. 312—10)

This invention relates to phonograph record cabinets, and has for its object the provision of a combined phonograph record holder and record container picture frame wherein the front of the holder contains a picture frame opening and, immediately behind it, a record container back stop for retaining the selected record container, such as a record envelope or album, against the opening so as to frame in the opening the portrait or other illustration on the cover of the record envelope or album; wherein the combined photograph record holder has a record container edge stop which prevents the record envelopes or albums from falling out of the cabinet; and is constructed with an open top and one open side so as to permit the record albums or envelopes to be inserted or removed from the top and also either from the right-hand side or from the left-hand side merely by rotating the holder through an angle of 90 degrees, thereby adapting the holder for the most convenient use by either a right-handed or a left-handed person and also enabling the holder to be mounted in or near a corner and still allowing the records to be freely inserted or removed from the top or from the exposed or accessible open side of the holder.

Other objects and advantages of the invention will become apparent during the course of the following description of the accompanying drawing, wherein.

Figure 1:
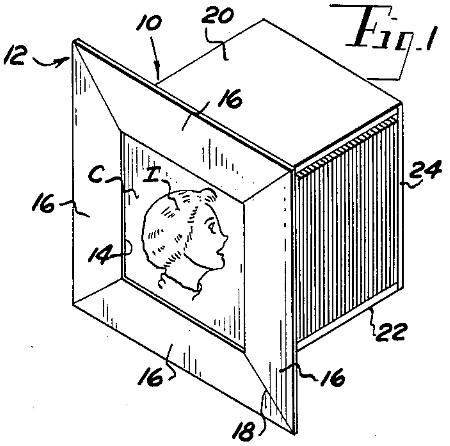
FIGURE 1 is a perspective view, looking from above, of a combined phonograph record holder and record container picture frame, according to one form of the invention, showing the illustration on one of the record containers, such as an envelope or album, framed in the front opening of the holder while other such record containers are stored behind the selected framed record container.
Figure 2:
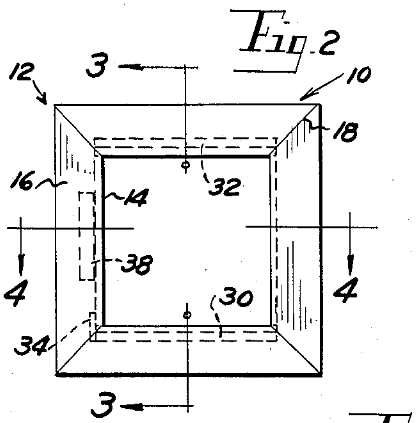
FIGURE 2 is a front elevation of the record holder and container frame shown in FIGURE 1.
Figure 3:
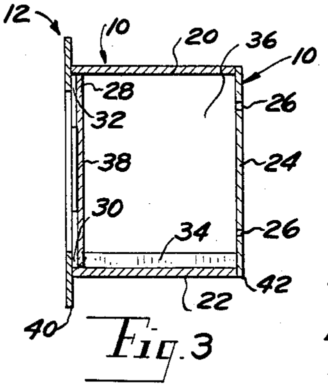
FIGURE 3 is a vertical longitudinal section taken along the line 3—3 in FIGURE 2.
Figure 4:
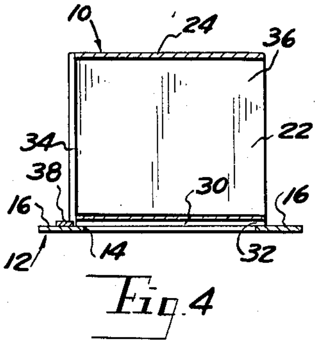
FIGURE 4 is a horizontal cross-section taken along the line 4—4 in FIGURE 2.
Figure 5:
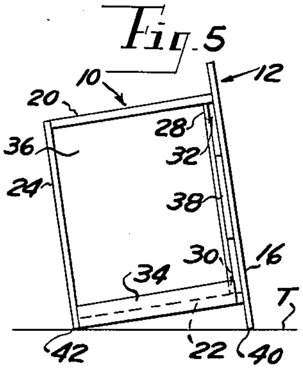
FIGURE 5 is a left-hand side elevation of the record holder shown in FIGURES 1 and 2, resting upon a supporting surface, such as a table.

Referring to the drawing in detail, FIGURE 1 shows a combined phonograph record holder and record container picture frame, generally designated 10, according to one form of the invention as consisting of a front border frame 12, preferably of rectangular outline, containing a central opening 14 for framing the cover illustration I on the record container C, such as an album or envelope. The front border frame 12 may be made in one piece or, as shown, from four frame members 16 with mitered ends meeting along diagonal lines or cracks 18. Secured to and extending rearwardly from the front border frame 12 are vertically-spaced parallel top and bottom walls 20 and 22 joined to one another at their rearward edges by a back wall 24. The back wall 24 is optionally provided with holes 26 for receiving fasteners (not shown) by which the record holder 10 may be mounted on a wall. FIGURE 5 shows the record holder 10 mounted on a horizontal supporting surface, such as a table top T.

Secured to and extending between the top and bottom walls 20 and 22 is an intermediate wall 28 disposed parallel to and spaced far enough away from the front wall 12 to provide lower and upper grooves 30 and 32 sufficiently wide to receive an ordinary record container, such as a record envelope or record album with a picture or other illustration I on the cover. Mounted on one side of the bottom wall 22 is a horizontal record container edge stop or rib 34 which serves as a stop for the edge of the record stored in the record storage compartment 36 contained between the walls 12, 20, 22 and 24. Secured to the frame member 16 on the same side as the rib 34 is a vertical record container back stop or bar 38 which is so placed as to properly position the record container C immediately behind and adjacent the rearward side of the front border frame 12 when the illustration I thereon is properly framed in the opening 14. The bottom wall 22 is preferably mounted on the lower frame member 16 at such a height from the lower edge 40 thereof as to cause the front border frame 12 and accordingly the record holder 10 to assume an inclined position (FIGURE 5) when placed upon a supporting surface, such as a table top T, with the front and rear edges 40 and 42 resting upon the surface T (FIGURE 5). The intermediate wall 28 may be solid or perforated, as a screen.

In the use of the combined record holder and container picture frame 10 of FIGURES 1 to 5 inclusive, the record holder 10 may either be mounted against a wall by fasteners inserted through the holes 26 (FIGURE 3) or, as previously stated above, supported on a table top or other horizontal supporting surface T, which may be the top of the phonograph cabinet, a shelf or any other convenient supporting surface. The selected record container C having the illustration I which it is desired to frame in the opening 14, is inserted in the grooves 30 and 32 from the right-hand end thereof and slid therealong between the front border frame 12 and the intermediate wall 28 until its far edge encounters the vertical stop bar 38 and halts. The portrait or other illustration I on the cover of the record container C is now framed in the opening 14 as a picture which may be changed whenever desired merely by substituting another record container C. This enhances the interior decoration of the room and makes use of the artistic cover illustrations on the record albums or envelopes. The remaining record albums are inserted from the right-hand side in the compartment or chamber 36 and slid to the left until their lower corners encounter the stop rib 34 on the left-hand side.

Figures 6, 7, 8:
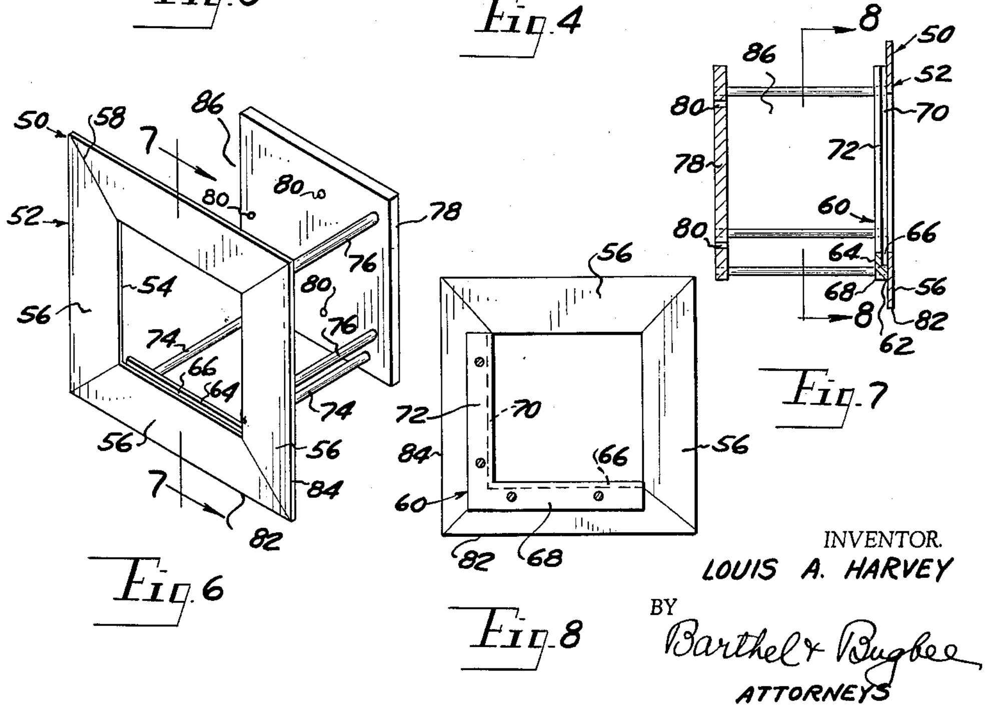
FIGURE 6 is a perspective view, looking from above, of a modified combined record holder and container frame, positionable to insert and remove records from either the right-hand or left-hand side and also from the top.
FIGURE 7 is a vertical longitudinal section taken along the line 7—7 in FIGURE 6.
FIGURE 8 is a vertical cross-section taken along the line 8—8 in FIGURE 7.

The modified combined phonograph record holder and container picture frame, generally designated 50, shown in FIGURES 6, 7 and 8 also is provided with a front border frame, generally designated 52, likewise containing a central opening 54 formed by the four component frame members 56 mitered and joined to one another at the diagonal cracks 58. As before, it will be understood that the frame 52 may be molded or otherwise formed in one piece rather than made up of four component frame members 56. Secured to the rearward side of the front border frame 52 is an angle stop rib or record container back stop 60 of L-shaped cross-section (FIGURES 7 and 8) having a spacing portion 62 engaging the frame 52 and a retaining portion 64 spaced apart therefrom to provide a horizontal groove 66 adjacent the horizontal arm 68 thereof and a vertical groove 70 adjacent the vertical arm 72 thereof. It will be understood that the L-shaped record container back stop 60 may, if desired, be made in two separate pieces with the spacing portion 62 as a separate spacing bar or strip.

Secured to and extending rearwardly from two of the frame components 56 are two pairs of rods 74 and 76 respectively arranged in planes at right angles to one another, one pair 74 serving as a record container rest while the other pair 76 serves as a record container edge stop or abutment and vice versa, as explained below in connection with the use of the invention. The rods 74 and 76 at their rearward ends are secured to a rear wall 78 arranged in spaced parallel relationship with the front wall or frame 52. Holes 80 are provided in the rear wall 78 for the reception of fasteners (not shown) for securing the holder to a wall, if desired. As before, the holder 50 may be mounted on a table top or the like, as in the case of the holder 10 shown in FIGURE 5. For convenience in describing the use of the modified holder 50, the outer edge of the lowermost frame member 56 in the position of FIGURE 6 is designated 82 as parallel to the plane of the rods 74, whereas the outer edge of the frame member 56 parallel to the plane of the rods 76 is designated 84, with the record storage space or compartment designated 86.

In the use of the modified combined record holder and picture frame, 50 shown in FIGURES 6, 7 and 8, let it be assumed that the holder 50 is mounted in the position shown in FIGURES 6, 7 and 8 with rods 76 on the right-hand side of the picture frame opening 54 and the rods 74 at the bottom. As before, the user selects a record container, such as an album or envelope (not shown) with a portrait or other illustration which he desires to frame temporarily and slides it from the left-hand side of the frame 52 (FIGURE 6) into the groove 66 in the arm 68 of the record container back stop 60 until its far edge encounters the groove 70 in the arm 72. As before, the portrait or other illustration is now frame in the opening 54 in the front wall of the frame 52. The user then inserts the remaining records in the record storage space or compartment 86 between the stop rib 60 secured to the front wall or frame 52 and the rear wall 78. The lower edges of these record albums or envelopes rest upon the rods 74 in the horizontal plane and their inner edges rest against the rods 76 disposed in a vertical plane and now serving as record container edge stops. It will be seen from FIGURE 6 that the stored records can be inserted into the storage space 86 either from the left or from above, and removed in the same direction.

The insertion and removal of records from the left-hand side, however, is most convenient to a left-handed person, whereas the records are easily inserted into the storage space 86 from the top by either a right-handed or a left-handed person. To more easily adapt the record holder 50 to the convenience of a right-handed person, the user merely rotates it 90 degrees or a quarter revolution in a clockwise direction from the position shown in FIGURE 6, so that the edge 84 becomes horizontal and now rests upon the table top or other supporting surface, whereas the edge 82 which was previously horizontal and rested upon the table top now assumes a vertical position. As a result, the previously-vertical-plane rods 76 are now disposed in a horizontal plane and the previously-horizontal-plane rods 74 now lie in a vertical plane. The user inserts the selected picture record container C from the right in the now horizontal groove 70 so that its far edge comes to rest in the now vertical groove 66 against the now-vertical arm 68 of the angle stop member 60. The remaining records are inserted either from the right or from the top into the space 86 so that their lower edges now rest upon the rods 76 and their inner vertical edges abut the rods 74 which are now in a vertical plane and now serve as record container edge stops.

Thus, in this manner, the record holder and picture frame 50 is instantly adapted to the convenience of use of either a right-handed or left-handed person, without any change in its construction and merely by altering its position. This feature is also useful where it is desired to place the record holder and picture frame 50 near a corner where insertion of the records would be blocked in one direction by the adjacent wall. In this instance, the record holder 50 is rotated 90 degrees in the manner described above, so as to present an access opening to the record storage compartment and frame opening 54 on the side which is not adjacent the corner.

What I claim is:

1. A combined record holder and pictured record container picture frame, comprising a front border frame disposed in masking relationship to the marginal zone of the foremost record container when inserted in the holder and having a central record container picture display aperture therein, a rear wall spaced rearwardly away from said front border frame and providing a record storage compartment therebetween, a record container supporting structure secured to and extending between the lower portions of said front border frame and rear wall and having an open top and at least one open side therein for insertion and removal of record containers, said record container supporting structure including a record container edge stop mounted within said record compartment in laterally-spaced relationpship to said open side, and a record container back stop mounted immediately behind said front border frame in closely-spaced parallel relationship thereto for retaining a picture-carrying record container in close proximity to said front border frame with the picture on the record container displayed through said aperture and with the marginal zone of the record container around the picture thereof concealed by said border frame.

2. A combined record holder and container picture frame, according to claim 1, wherein said record container back stop includes an approximately L-shaped member with elongated mutually perpendicular horizontal and vertical arms said mounted in spaced parallel relationship to the rearward surface of said front border frame and disposed adjacent said aperture, said vertical arm being mounted said open side of said record holder in laterally-spaced relationship therewith whereby to also enable insertion and removal of the displayed foremost record container either through the open top or through the open side of said holder.

References Cited by the Examiner

UNITED STATES PATENTS

| | | | |
|---|---|---|---|
| D. 89,674 | 4/1933 | Baetz | D29—20 |
| 719,334 | 1/1903 | Herron | 312—234 X |
| 954,555 | 4/1910 | Willoughby | 40—65 X |
| 1,195,056 | 8/1916 | Man | 40—65 |
| 1,306,737 | 6/1919 | Banschach | 312—13 |

(Other references on following page)

5

UNITED STATES PATENTS

| | | | |
|---|---|---|---|
| 1,465,178 | 8/1923 | Rimke | 312—8 |
| 1,494,258 | 5/1924 | Liberio | 312—8 |
| 2,153,149 | 4/1939 | MacHarg | 40—152 |
| 2,385,603 | 9/1945 | Bloom | 312—118 X |
| 2,557,436 | 6/1951 | Isserstedt | 312—12 |
| 2,839,857 | 6/1958 | Teller | 40—152 X |
| 3,108,684 | 10/1963 | Apicella | 206—45.31 |

6

FOREIGN PATENTS

| | | |
|---|---|---|
| 940,214 | 5/1948 | France. |
| 1,198,375 | 6/1959 | France. |
| 1,255,724 | 1/1961 | France. |
| 266,831 | 3/1927 | Great Britain. |

CLAUDE A. LE ROY, *Primary Examiner.*

CHANCELLOR E. HARRIS, FRANK B. SHERRY, *Examiners.*

A. FRANKEL, *Assistant Examiner.*